United States Patent [19]
Dorr et al.

[11] 3,963,423
[45] June 15, 1976

[54] CATALYTIC REACTOR HAVING ANNULAR CATALYST TRAY MEANS

[75] Inventors: Karl Heinz Dörr, Mainz; Waldemar Weber, Frankfurt am Main; Hugo Grimm, Frankfurt am Main; Gustav Rowedder, Frankfurt am Main, all of Germany

[73] Assignee: Metallgesellschaft Aktiengesellschaft, Frankfurt am Main, Germany

[22] Filed: July 12, 1974

[21] Appl. No.: 488,137

[30] Foreign Application Priority Data
July 26, 1973 Germany............................ 2337958

[52] U.S. Cl. ............................ 23/288 R; 23/288 K; 423/533
[51] Int. Cl.² ...................... B01J 8/04; C01B 17/68
[58] Field of Search ...................... 23/288 K, 288 R; 423/533

[56] References Cited
UNITED STATES PATENTS

| | | | |
|---|---|---|---|
| 1,91,080 | 7/1933 | Beardsley | 23/288 K |
| 1,252,976 | 1/1918 | Wells | 23/288 K X |
| 1,959,898 | 5/1934 | Brode et al. | 23/288 K |
| 1,970,923 | 8/1934 | Spalding | 423/533 |
| 2,180,727 | 11/1939 | Carter | 423/533 |
| 2,317,449 | 4/1943 | Flock | 23/288 R |
| 2,338,346 | 1/1944 | Mather | 23/288 R |
| 2,391,315 | 12/1945 | Hulsberg | 23/288 K |
| 2,846,291 | 8/1958 | Johannsen et al. | 423/533 |
| 3,477,833 | 11/1969 | McMullin et al. | 23/288 R X |
| 3,556,738 | 1/1971 | Schober | 23/288 R X |
| 3,694,169 | 9/1972 | Fawcett et al. | 23/288 K X |
| 3,755,549 | 8/1973 | Guth | 423/533 |

FOREIGN PATENTS OR APPLICATIONS

| | | | |
|---|---|---|---|
| 1,258,400 | 1/1968 | Germany | 23/288 R |
| 460,017 | 1/1937 | United Kingdom | 23/288 R |

*Primary Examiner*—Barry S. Richman
*Assistant Examiner*—Bradley R. Garris
*Attorney, Agent, or Firm*—Burgess, Dinklage & Sprung

[57] ABSTRACT

A catalytic reactor for converting sulfur dioxide to sulfur trioxide, suitable for high throughput rates of up to about 500,000 standard cubic meters per hour. The reactor includes a plurality of separate reaction chambers each containing catalyst trays connected in parallel in the gas flow path. The catalyst trays define gas spaces and alternate gas spaces are provided with inlets for supplying a partial stream of the sulfur dioxide containing gases which are divided in the gas spaces. The gas spaces adjacent to the gas spaces provided with inlets are provided with outlets for withdrawing partial streams of the gases which have passed through the catalyst trays.

7 Claims, 5 Drawing Figures

Fig. 1

CATALYTIC REACTOR HAVING ANNULAR CATALYST TRAY MEANS

BACKGROUND

This invention relates to catalytic reactors for the catalytic reaction of $SO_2$ to $SO_3$, comprising a plurality of separate reaction chambers, which contain catalyst trays, which are connected in parallel in the gas flow path and consist of catalyst and gas-permeable plates, and gas spaces between the catalyst trays and before the first and behind the last catalyst tray, conduit means for feeding partial streams of $SO_2$-containing gases into gas spaces, conduit means for withdrawing the gases from gas spaces when the gases have passed through the catalyst trays, and cooling means for cooling the gases as they flow from one reaction chamber into the next.

In the conventional catalytic reactors, a plurality of catalyst trays are arranged one over the other and $SO_2$-containing gases pass therethrough from top to bottom or partly from bottom to top. Gases which have passed through a catalyst tray are cooled to the operating temperature of the next catalyst before they enter the same. For this purpose the gas spaces under and over the catalyst trays are completely separated by partitions or are separated by gas-permeable heat exchangers or mixing plates, in which cooling gases are admixed. In most cases, partitions are provided for a complete separation and the gases are withdrawn from a gas space through a gas outlet pipe and are then cooled in heat exchangers disposed outside the catalytic reactor and supplied through a gas inlet pipe into the other gas space (Printed German Application No. 1,186,837, German Patent Specifications Nos. 1,567,671; 662,445 and 972,117, Printed German Application No. 1,118,164).

Owing to structural and economic consideration, these catalyst vessels are suitable for gas rates up to about 100,000 standard cubic meters per hour. With higher gas rates, the catalyst tray must be so large in diameter to accommodate the required quantity of catalyst that a large number of supports are required. Besides, the pressure loss becomes very high.

It has also been proposed to reduce the overall height of catalytic reactors in that the partitions between the catalyst trays are inclined and the gas outlet and gas inlet pipes on both sides of a partition are offset relative to each other (Printed German Application No. 2,157,198). These proposals do not afford an advantage as far as the accommodation of large quantities of catalyst for high throughput rates is concerned.

It is also known for an operation with high throughput rates to provide in each reaction chamber two catalyst trays, which are arranged one over the other and connected in parallel in the gas flow path. In such arrangements, a partial stream of the $SO_2$-containing gas is introduced above the upper catalyst tray and another below the lower catalyst tray, the partial streams are combined when they have passed through the catalyst trays, and the combined streams are withdrawn from the space between the catalyst trays (German Patent Specification No. 1,258,400). That arrangement results in a smaller cross-section and volume of the catalytic reactor and in a lower temperature so that a gas throughput rate up to about 200,000 standard cubic meters per hour is enabled.

SUMMARY

It is an object of the invention to provide a catalytic reactor which is suitable for high throughput rates and which is improved from the technological and economic aspects and may be used for throughput rates up to about 500,000 standard cubic meters per hour.

According to the invention this object is accomplished in that at least three catalyst trays are contained in each reaction chamber, alternate gas spaces are provided with inlet means for supplying a partial stream of the $SO_2$-containing gases, the partial stream or streams is or are divided in the gas spaces defined by the catalyst trays, and those gas spaces which are adjacent to the gas spaces provided with inlet means are provided with outlet means for withdrawing partial streams of the gases which have passed through the catalyst trays.

The inlet and outlet means may consist of circular or oval or rectangular supports or of annular ducts provided with openings. Oval supports require the smallest overall height.

The catalyst trays may be horizontal and disposed one over the other or may be vertical and disposed one beside the other.

There is a gas space before the first and behind the last catalyst tray, too (see FIGS. 1–5). Those partial gas streams which are led into such gas space (before having been passed through a tray) are not divided:

FIG. 1, 2, 5: the partial stream led into the first and last gas space

FIG. 3: the partial stream led into the first gas space

FIG. 4: the partial stream led into the last gas space.

There need not be in each case a conduit means before the first and behind the last catalyst tray.

The partial streams led into a gas space are only divided in those alternate gas spaces which are between two catalyst trays.

DESCRIPTION

If three catalyst trays are arranged in each reaction chamber, one partial stream of the $SO_2$-containing gases is suitably supplied into the reaction chamber between the cover of the rection chamber and the first catalyst tray. In this case the cover will not be contacted by gases which have been heated by the catalytic reaction. The second reaction chamber is operated in the same manner so that the cover of this reaction chamber, which cover is the bottom of the first reaction chamber, is cooled by the inflowing colder gas stream. If each reaction chamber contains catalyst trays in an odd number in excess of three, a partial stream may be supplied into the gas space above the bottom of the reaction chamber and may not be divided further in the gas space. This practice enables a supply of colder gases to a larger number of catalyst tray plates.

More catalyst trays are provided per reaction chamber in case of an increase in the gas throughput rate.

According to a preferred feature of the invention, four catalyst trays or an even number of catalyst trays in excess of four are arranged in each reaction chamber, inlet means for supplying a partial stream of the $SO_2$-containing gases into the gas space preceding the first catalyst tray are provided, also inlet means for supplying a partial stream into the gas space succeeding the last catalyst tray, and inlet means to the gas spaces which succeed even-numbered catalyst trays, except the last catalyst tray, the gas streams from said catalyst trays are divided in said gas spaces, and outlet means for withdrawing the partial gas streams which have passed through the catalyst trays are contained in the gas spaces between even-numbered and odd-numbered catalyst trays. In this arrangement, the covers and bottoms of the reaction chambers are contacted only by colder gases and may be made of less expensive material. Only the partial streams which are led into gas spaces which succeed even — numbered trays — with exception of the last catalyst tray — are divided in the inlet gas spaces (see FIGS. 1, 2, 5).

According to a preferred feature, the catalyst trays are arranged one over the other and are annular with their inner edges resting on a central column. In this case the catalyst trays may be self-supporting from the central column to the side wall of the catalytic reactor. The central column requires only a small part of the area of the catalyst trays and enables a simple supporting of the plates of the catalyst trays.

According to a preferred feature, the central column is hollow and provided with outlet and/or inlet means for handling partial streams flowing from and to the gas spaces. In this case the advantages afforded by the use of a carrying central column are supplemented by the advantage that a number of the pipes or annular ducts otherwise provided in the side wall of the catalytic reactor and serving to supply or withdraw the gases can be eliminated.

According to a preferred feature, the central column contains inlet means for allowing partial streams from at least one gas space to enter the column and common outlet means for supplying the combined partial streams into one gas space and the latter is provided with outlet means for withdrawing the combined partial streams. In that case advantages are afforded by the use of a carrying central column and by the elimination of pipes and only one outlet pipe or annular duct is required which is contacted with hot reaction gases. This pipe or annular duct may be protected by a refractory lining or other measures without a high expenditure.

According to another preferred feature, the central column is provided with outlet means for withdrawing all partial streams to be withdrawn from the gas spaces and with inlet means for supplying those partial streams which have been combined in the central column into the next reaction chamber, and the catalytic reactor contains a cooling device for cooling the combined partial streams, which cooling device succeeds the inlet means of the central column. In that case the bottom of the upper reaction chamber is formed with an opening for the inlet means provided in the central column, a heat exchanger passed through by the gases from the upper reaction chamber and serving to cool said gases is disposed in the catalytic reactor between the upper and lower reaction chamber, and the cover of the lower reaction chamber is provided with inlet means connected to the catalyst trays. In this case, connecting conduits and their insulation are eliminated and a highly compact structure is obtained. The heat exchanger may be adapted to be withdrawn so that repairs can be carried out more quickly and at lower cost, particularly if the heat exchanger consists of a plurality of segments.

According to a preferred feature, the central column is provided in the first reaction chamber with inlet means for supplying cold cooling gases into the central column. The reaction gases are thoroughly mixed in the central column so that their temperature is lowered. In case of a slight reduction of the temperature to about 530°–580 °C., the succeeding heat exchanger and any connecting conduits required may be made at much lower costs and will be used under less severe conditions.

According to another preferred feature the catalyst vessel comprises a double shell, which surrounds the catalyst chambers and is passed through by gas, and inlet means for supplying the partial streams into the gas spaces are arranged in the inner shell. This results in particularly large advantages because the entire outer shell of the catalytic reactor, the plates of the catalyst trays, and the zones which contain hot catalyst are effectively cooled. Additional cooling ribs may be provided at points which are particularly hot. Besides, only one inlet means and one outlet means are required.

According to another preferred embodiment, the reaction chambers are separate and disposed one beside the other. Each reaction chamber may be separate, or a plurality of units consisting each of a plurality of reaction chambers may be separate and arranged one beside the other. In this case the pressure difference between the top cover and the bottom is much reduced so that smaller anchoring forces are required in the catalyst vessel.

The invention may be used for a normal catalysis without interstage absorption or for a double catalysis involving one or more units for the interstage absorption of the resulting $SO_3$. In the heat exchangers, the gases flowing between two successive reaction chambers may be cooled by gaseous, vaporous or liquid fluids. The catalysts consist preferably of a commercial catalyst on the basis of vanadium pentoxide. It is possible to use other catalysts, for instance such on the basis of iron oxide. It is also possible to use one type of catalysts in one reaction stage and another type in another reaction stage.

DESCRIPTION OF THE DRAWING

The invention will be explained more fully and by way of example with reference to the drawings, in which.

Figure 1:
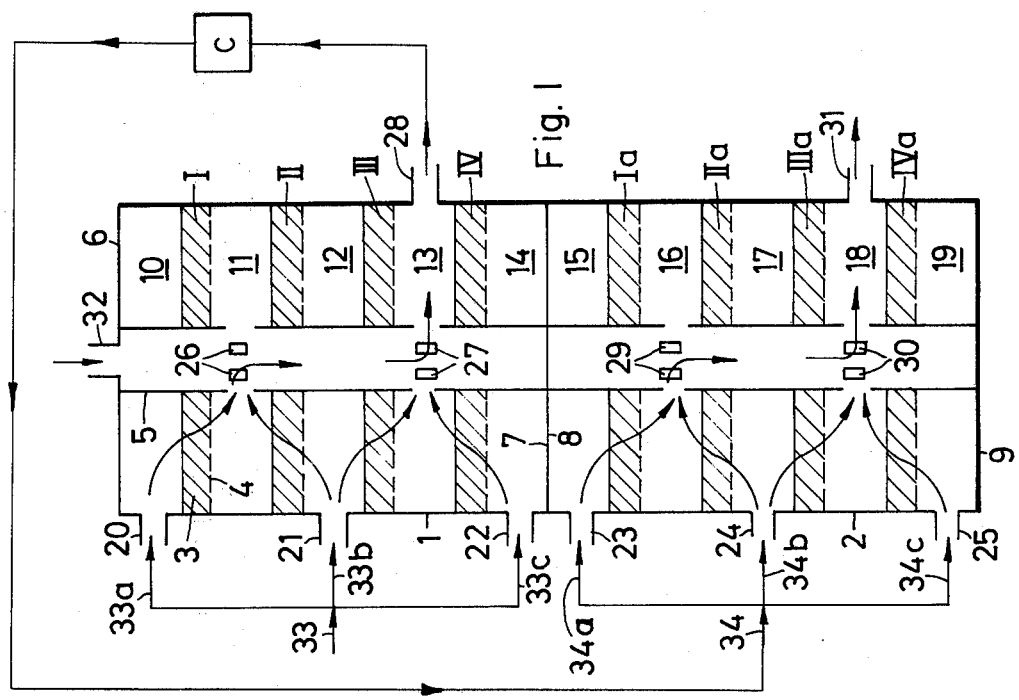
FIG. 1 is a diagrammatic vertical sectional view showing two superimposed reaction chambers, a central column, pipes for supplying the partial streams and a pipe for withdrawing the combined partial streams.
Figure 3:
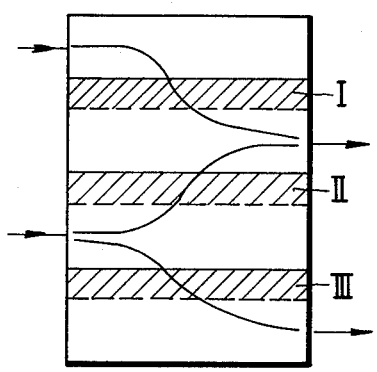
FIG. 3 is a diagrammatic view showing the flow path of the gas in an arrangement comprising three catalyst trays in a reaction chamber.

In accordance with FIG. 1, a reaction chamber 1 contains catalyst trays I to IV and a reaction chamber 2 contains catalyst trays Ia to IVa. Each catalyst tray comprises catalyst 3, which lies on a gas-permeable, perforated plate 4. The plates 4 are annular and rest with their inner edge on a central column 5 and with their outer edge on the wall of the reaction chambers 1 and 2. The supports are not shown. The reaction chamber 1 is closed by a cover 6 and a bottom 7 and the reaction chamber 2 by a cover 8 and a bottom 9. The reaction chamber 1 contains annular spaces 10 to 14 and the reaction chamber 2 has similar annular gas spaces 15 to 19. The reaction chamber 1 is provided with an inlet pipe 20 to the gas space 10, inlet means 21 to the gas space 12 and inlet means 22 to the gas space 14. The reaction chamber 2 is provided with inlet means 23 to the gas space 15, inlet means 24 to the gas space 17 and inlet means 25 to the gas space 19. The reaction chamber 1 is provided in the central column 5 with outlet openings 26 from the gas space 11 and with outlet means 27 from the gas space 13 and is also provided with outlet means 28 in the shell. The reaction chamber 2 is provided in the central column 5 with outlet means 29 from the gas space 16 and with outlet means 30 from the gas space 18 and is also provided with outlet means 31 in the shell. Inlet means 32 to the central column 5 is provided in the cover 6 of the catalyst chamber 1.

The SO$_2$-containing gas is supplied through conduit 33. A partial stream 33a is supplied into the gas space 10 and flows through the catalyst tray I into the gas space 11 and through 26 into the central column 5. A partial stream 33b is supplied into the gas space 12 and is divided therein and flows partly through the catalyst tray II into the gas space 11 and through 26 into the central column 5. The remainder flows through the catalyst tray III into the gas space 13. A partial stream 33c is supplied into the gas space 14 and flows through the catalyst tray IV into the gas space 13. The partial stream 33a which has flown from the gas space 11 through 26 into the central column and that portion of the partial stream 33b which has flown from the gas space 11 through 26 into the central column as well as cooling air supplied at 32 form a combined partial stream, which flows at 27 into the gas space 13. From the gas space 13, the combined partial streams 33a, 33b, 33c and the cooling air are withdrawn through the outlet pipe 28 from the reaction chamber 1 and are cooled in cooler (C), and then conducted into a conduit 34 as shown in FIG. 1. The treatment in the reaction chamber 2 is analogous to that in the reaction chamber 1 but no cooling air is supplied.

Figure 2:
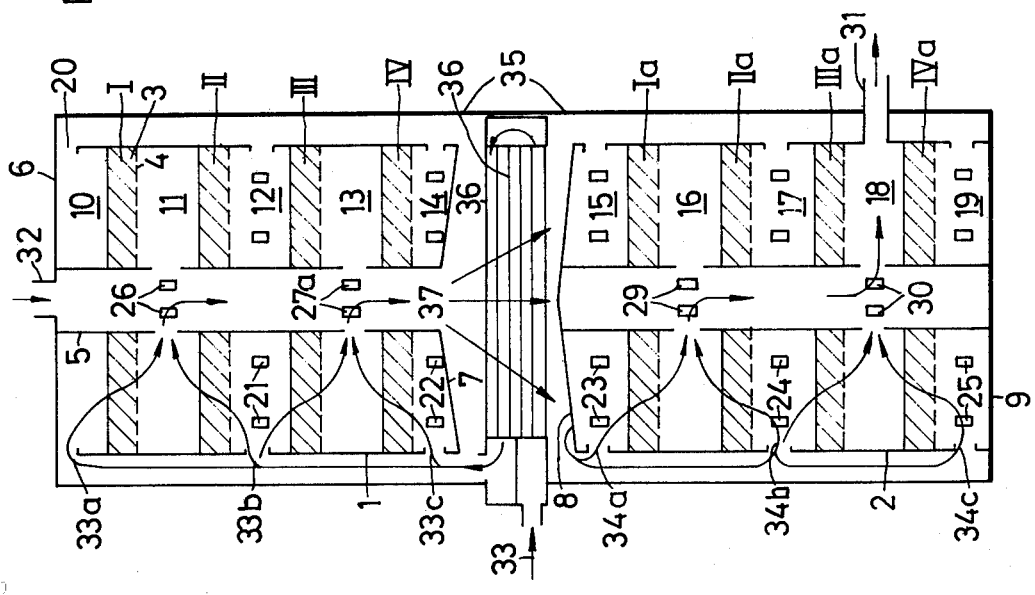
FIG. 2 is a diagrammatic vertical sectional view showing two superimposed reaction chambers with a double-walled structure, a central column and a heat exchanger contained in the catalytic reactor between the two reaction chambers.

In accordance with FIG. 2, the catalytic reactor which contains annular gas spaces 10 to 19 comprises a double shell 35, which is passed through by gas. A heat exchanger 36 serving as a cooler is contained in the catalytic reactor and disposed between the reaction chamber 1 and the reaction chamber 2. The partial stream 33c which has passed from the gas space 14 through the catalyst tray IV into the gas space 13 and that part of the partial stream 33b which has flown from the gas space 12 through the catalyst tray III flow through outlet openings 27a into the central column 5. The combined partial streams 33a, 33b, 33c and the cooling air flow through the outlet 37 provided in the central column 5 into the heat exchanger 36, then into the double shell 35 of the reaction chamber 2 and from the latter as partial streams 34a, 34b, 34c into the gas spaces 15, 17, and 19. The subsequent treatment is analogous to that in FIG. 1.

It will be understood that the gas is completely distributed throughout each gas space.

Figure 4:
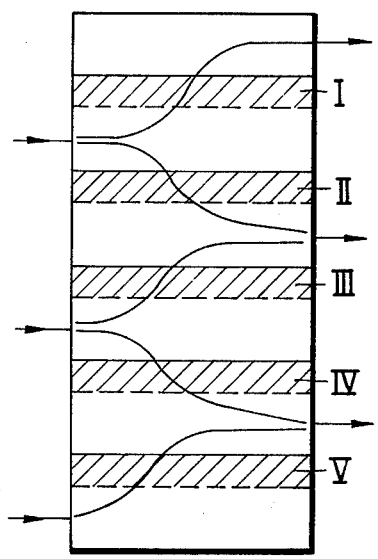
FIG. 4 is a diagrammatic view showing the flow path of the gas in an arrangement comprising five catalyst trays in a reaction chamber.
Figure 5:
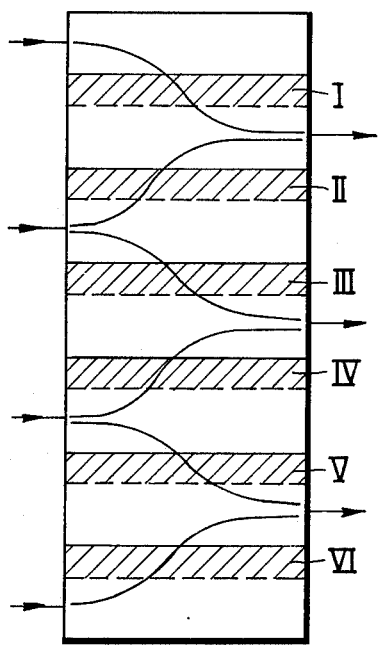
FIG. 5 is a diagrammatic view showing the flow path of the gas in an arrangement comprising six catalyst trays in a reaction chamber.

If more than five or six catalyst trays are provided in a reaction chamber, the arrangements shown in FIGS. 4 and 5 will be enlarged accordingly.

The advantages of the invention reside in that catalytic reactors can be built for gas throughput rates up to about 500,000 standard cubic meters per hour or, for lower gas throughput rates, to reduce the costs and the structural expenditure compared to known structures. The enclosed space is much reduced. The plates of the catalyst trays and the covers and bottoms of the reaction chambers are subjected to lower thermal stresses. Because the catalytic reactor is much smaller in diameter, the plates of the catalyst trays may have a smaller camber and thickness if they consist of ceramic material and may have a smaller thickness and a lighter carrying structure and may even be selfsupporting if they consist of cast iron or steel. The smaller diameter permits of a reduction of the wall thicknesses, and the reduction of the enclosed space reduces the insulation expenditure as well as the heat losses. The weight applied to the supports by those catalyst trays which are passed through by the gas from bottom to top is reduced by the differential pressure. The anchoring forces required in the catalytic reactor are much reduced.

We claim:

1. Catalytic reactor for the catalytic reaction of SO$_2$ to SO$_3$, comprising
    a. a plurality of separate reaction chamber means;
    b. each reaction chamber means containing a hollow central column and at least three annular catalyst tray means vertically spaced apart one over the other with the inner edges thereof in contact with said central column;
    c. each annular catalyst tray means consisting of catalyst means and gas-permeable plate means;
    d. a first gas space before the uppermost catalyst tray means, common gas spaces between adjacent catalyst tray means, and a last gas space after the lowermost catalyst tray means;
    e. inlet means for feeding partial streams of SO$_2$-containing gas into alternate gas spaces starting with said first gas space, the partial streams fed into said common gas spaces being divided such that a portion flows through the upper tray means and the balance through the lower tray means;
    f. the gas spaces downstream and adjacent to said alternate gas spaces communicating with inlets in the hollow column for allowing partial streams of gases to enter said hollow column after they pass through a catalyst tray means;
    g. said hollow column having a common outlet for combined partial gas streams communicating with a gas space other than an alternate gas space;
    h. conduit means for supplying said gases to the inlet means of said alternate gas spaces and conduit means connected to the gas space in communication with the common outlet of the central column; and
    i. cooling means for cooling the combined gases flowing from one reaction chamber means to the next via the conduit means connected to the gas space in communication with the common outlet of the central column.

2. Catalytic reactor of claim 1 wherein four catalyst tray means or an even number of catalyst tray means in excess of four are positioned in each reaction chamber means.

3. Catalytic reactor of claim 1 wherein the common outlet of the central column in the first reaction chamber means communicates via the cooling means with the inlet means for feeding $SO_2$ gases to the next reaction chamber means.

4. Catalytic reactor of claim 1 wherein the central column in the first reaction chamber means has means for supplying cold cooling gases thereto.

5. Catalytic reactor of claim 1 wherein an outer shell surrounds the reaction chamber means and defines an annular space through which inlet $SO_2$-containing gases flow.

6. Catalytic reactor of claim 1 wherein the reaction chamber means are separate and arranged one beside the other.

7. Catalytic reactor for the catalytic reaction of $SO_2$ to $SO_3$, comprising:

a. two reaction chamber means, one over the other and connected by cooling means;

b. each reaction chamber means containing a hollow central column and at least three annular catalyst tray means vertically spaced apart one over the other with the inner edges thereof in contact with said central column;

c. each annular catalyst tray means consisting of a catalyst means and gas-permeable plate means;

d. each reaction chamber means having a first gas space before the uppermost catalyst tray means, common gas spaces between adjacent catalyst tray means, and a last gas space after the lowermost catalyst tray means;

e. each reaction chamber means having inlet means for feeding partial streams of $SO_2$-containing gases into alternate gas spaces starting with the first gas space, the partial streams fed into said common gas spaces being divided such that a portion flows through the upper tray means and the balance through the lower tray means;

f. the gas spaces downstream and adjacent to said alternate gas spaces communicating with inlets in the hollow column for allowing partial streams of said gases to enter said hollow column after they pass through a catalyst tray means;

g. the hollow column of the upper reaction chamber means having a common outlet for combined partial gas streams communicating with the cooling means connecting the two reaction chamber means and the inlet means of the lower reaction chamber means;

h. the hollow column of the lower reaction chamber means having a common outlet for combined partial gas streams communicating with a gas space other than an alternate gas space; and i. conduit means connected to the gas space in communication with the common outlet of the central column in the lower reaction chamber means.

* * * * *